US010416297B2

(12) United States Patent
Dorrington et al.

(10) Patent No.: US 10,416,297 B2
(45) Date of Patent: Sep. 17, 2019

(54) SIGNAL HARMONIC ERROR CANCELLATION METHOD AND APPARATUS

(71) Applicant: University of Waikato, Hamilton (NZ)

(72) Inventors: Adrian Andrew Dorrington, Auckland (NZ); Lee Vincent Streeter, Hamilton (NZ)

(73) Assignee: WaikatoLink Limited (NZ)

( * ) Notice: Subject to any disclaimer, the term of this patent is extended or adjusted under 35 U.S.C. 154(b) by 256 days.

(21) Appl. No.: 15/302,108

(22) PCT Filed: Apr. 8, 2015

(86) PCT No.: PCT/NZ2015/000022
§ 371 (c)(1),
(2) Date: Oct. 5, 2016

(87) PCT Pub. No.: WO2015/156684
PCT Pub. Date: Oct. 15, 2015

(65) Prior Publication Data
US 2017/0205497 A1   Jul. 20, 2017

(30) Foreign Application Priority Data

Apr. 8, 2014 (NZ) ......................................... 623609

(51) Int. Cl.
*G01S 7/491* (2006.01)
*G01S 7/497* (2006.01)
(Continued)

(52) U.S. Cl.
CPC .............. *G01S 7/497* (2013.01); *G01S 7/4911* (2013.01); *G01S 7/4915* (2013.01); *G01S 17/36* (2013.01); *G01S 17/89* (2013.01)

(58) Field of Classification Search
CPC ........ G01S 17/36; G01S 7/4915; G01S 7/497; G01S 17/89; G01S 7/4911
(Continued)

(56) References Cited

U.S. PATENT DOCUMENTS

2007/0064135 A1* 3/2007 Brown ................. H04N 5/3765
348/311
2007/0240486 A1   10/2007 Moore et al.
(Continued)

OTHER PUBLICATIONS

Payne, Andrew D., et al., "Improved linearity using harmonic error rejection in a full-field range imaging system", Proc. SPIE, 6805, 68050D (2008).
(Continued)

*Primary Examiner* — Daniel L Murphy
(74) *Attorney, Agent, or Firm* — Brinks Gilson & Lione; Ryan L. Marshall

(57) ABSTRACT

In one aspect the invention provides a time of flight camera system which includes a time of flight transmitter arranged to transmit modulated radiation at a target, and a phase adjustment element configured to adjust the phase of a source modulation signal used to modulate the radiation transmitted at the target. This phase adjustment element provides a set of phase separated output signals, each output signal provided having one of a set phase offsets values applied, where at least one of these phase offset values is the cancellation phase value of another member of the set of phase offset values. The camera system also includes an image sensor modulated with the source modulation signal and configured to measure radiation reflected from a target, and a processor arranged to receive the image sensor measurements and being programmed to resolve range information from the measurements received by the image sensor.

11 Claims, 5 Drawing Sheets

(51) Int. Cl.
*G01S 17/36* (2006.01)
*G01S 17/89* (2006.01)

(58) Field of Classification Search
USPC .......................................................... 356/5.01
See application file for complete search history.

(56) References Cited

U.S. PATENT DOCUMENTS

2010/0268516 A1  10/2010  Payne et al.
2012/0013887 A1   1/2012  Xu et al.
2012/0098964 A1   4/2012  Oggier et al.

OTHER PUBLICATIONS

Extended European Search Report for related European Application No. 15775931.7, dated Nov. 29, 2017 (9 pages).
International Preliminary Report on Patentability for related International Application No. PCT/NZ2015/000022, dated Oct. 12, 2016 (7 pages).
International Search Report and Written Opinion for related International Application No. PCT/NZ2015/000022, dated Dec. 3, 2015 (9 pages).
Payne, Andrew D., et al., "Improved measurement linearity and precision for AMCW time-of-flight range imaging cameras," *Applied Optics*, 49(23):4392-4403 (2010).

* cited by examiner

SIGNAL HARMONIC ERROR CANCELLATION METHOD AND APPARATUS

REFERENCE TO EARLIER FILED APPLICATIONS

This application claims the benefit of the filing date of PCT Application No. PCT/NZ2015/000022 filed 8 Apr. 2015, and NZ provisional application number 623609 filed 8 Apr. 2014, the disclosures of which are hereby incorporated by reference in their entirety.

FIELD OF THE INVENTION

This invention relates to a signal harmonic error cancellation method and apparatus, preferably employed in conjunction with a time of flight range imaging camera system.

BACKGROUND OF THE INVENTION

In a number of applications there is a requirement for the provision of sinusoidal waveform signals to drive the modulation of other signals, or to modify transducer outputs. The use of sinusoidal waveform signals is preferred in a number of instances to minimise the number of harmonic components present in a signal other than its base frequency.

For example, Time of Flight (herein 'ToF') range imaging applications modulate both a light source for a scene and an imaging transducer with a common modulation frequency. Phase differentials are detected between the output source and received transducer signals to provide an indication as to the range to a particular object in the illuminated scene. An example of this type of time of flight image ranging technology is disclosed in the patent specification published as PCT Publication No. WO2004/090568.

Further modifications to these kinds of range determining camera systems have also been developed which apply a set of equal size increases of phase offsets to the light source being used. An original or source modulation signal is used to modulate the sensor output while the light transmitter output is modulated by the same original source modulation signal with a phase offset applied, allowing relative time of flight phase changes to be detected. Multiple phase measurements are made by integrating the output of the receiving sensor over a measurement time for each selected phase value applied. These sets of measurement are then used to compute and account for all the unknown variables contributing to the sensor reading.

Various other types of phase sensitive imaging applications have also been developed which require the provision of such modulation signals, such as for example, diffusion tomography, intensity modulated optical spectrometry (IMOS) and fluorescence lifetime imaging (FLM) applications.

The processing algorithms and mathematics employed in such applications often rely on the assumption that the modulation or sampling frequencies used are sinusoidal. However, in practice these expected sine waves are commonly provided by square waves which can be easily generated using off the shelf, low cost digital components.

Square waves include a number of higher order harmonic frequencies in their makeup. These high order harmonics can introduce a source of error in measurements of phase completed by these imaging systems.

It would therefore be of advantage to have improvements over the prior art which addressed the above issues or at least provided the public with an alternative choice.

DISCLOSURE OF THE INVENTION

According to one aspect of the present invention there is provided a method of signal harmonic error cancellation for a time of flight camera system characterised by the steps of;
i) generating a source modulation signal which includes at least one identified harmonic frequency, and
ii) adjusting the phase of the source modulation signal to provide a set of phase separated output signals which cancel error provided by the identified harmonic frequency, the output signals having phase offset values determined by the steps of:
   a. calculating the phase of the contribution of the identified harmonic to a measurement taken with a selected phase step value,
   b. determining a cancellation phase for the calculated phase of the harmonic contribution,
   c. determining a further phase step value which provides a measurement which includes a contribution from the identified harmonic, this contribution having a phase equal to the cancellation phase,
   d. repeating steps a-c to determine the phase values to be applied to the set of phase separated output signals,
iii) providing the set of phase adjusted signals to a time of flight camera system.

According to a further aspect of the present invention there is provided a method substantially as described above characterised by the additional steps of:
iv) illuminating a time of flight camera system image sensor with radiation modulated by the first member of the set of phase separated output signals,
v) modulating the output of the image sensor with the source modulation signal and generating a time of flight camera measurement by integrating the output of the image sensor over a standard measurement time while only the first member of the set of phase separated output signals is used to modulate the illuminating radiation,
vi) illuminating the image sensor with radiation modulated by only the next member of the set of phase separated output signals and integrating the output of the image sensor over the standard measurement time while modulating the output of the image sensor with the source modulation signal to generate a further measurement,
vii) repeating step (vi) above for each remaining member of the set of phase separated output signals.

Preferably the phase of the contribution of the identified harmonic is calculated relative to the fundamental frequency of the source modulation signal.

According to one aspect of the present invention there is provided a method of signal harmonic error cancellation for a time of flight camera system characterised by the steps of;
i) generating a source modulation signal which includes at least one harmonic component, and
ii) adjusting the phase of the source modulation signal to provide a set of four phase separated output signals,
iii) providing the set of four phase adjusted signals to a time of flight camera system, wherein a set output signals have phase offsets values equal to 0, 90, 120 and 210 degrees for one set of output signals, or 0, 90, 240, and 330 degrees for an alternative set of output signals.

According to yet another aspect of the present invention there is provided a signal harmonic error cancellation apparatus for a time of flight camera system which includes a source modulation signal generator configured to generate a source modulation signal which includes at least one harmonic component, and a phase adjustment element configured to adjust the phase of a source modulation signal supplied by the source modulation signal generator characterised in that the phase adjustment element provides four output signals having phase offsets equal values equal to either 0, 90, 120 and 210 degrees, or 0, 90, 240, and 330 degrees.

According to a further aspect of the present invention there is provided a time of flight camera system which includes a time of flight transmitter arranged to transmit modulated radiation at a target, and a phase adjustment element configured to adjust the phase of a source modulation signal used to modulate the radiation transmitted at the target, the phase adjustment element providing a set of phase separated output signals, each output signal provided having one of a set phase offsets values applied, where at least one of these phase offset values is the cancellation phase value of another member of the set of phase offset values, and an image sensor configured to measure radiation reflected from a target, the output of the image sensor being modulated by the source modulation signal, and a processor arranged to receive the image sensor measurements and being programmed to resolve range information from the measurements received by the image sensor.

According to a further aspect of the invention there is provided a time of flight camera system substantially as described above wherein the processor is configured to generate time of flight camera measurements by executing instructions which complete the steps of:

1) illuminating a time of flight camera system image sensor with radiation modulated by the first member of the set of phase separated output signals,
2) modulating the output of the image sensor with the source modulation signal and generating a first time of flight camera measurement by integrating the output of the image sensor over a standard measurement time while only the first member of the set of phase separated output signals is used to modulate the illuminating radiation,
3) illuminating the image sensor with radiation modulated by only the next member of the set of phase separated output signals and integrating the output of the image sensor over the standard measurement time while modulating the output of the image sensor with the source modulation signal to generate a further measurement,
4) repeating step 3 above for each remaining member of the set of phase separated output signals.

According to another aspect of the invention there is provided a time of flight camera system which includes a time of flight transmitter arranged to transmit modulated radiation at a target, and a phase adjustment element configured to adjust the phase of a source modulation signal used to modulate the radiation transmitted at the target, the phase adjustment element providing four output signals having phase offsets equal values equal to either 0, 90, 120 and 210 degrees, or 0, 90, 240, and 330 degrees, an image sensor configured to measure radiation reflected from a target, the output of the image sensor being modulated by the source modulation signal and a processor arranged to receive the image sensor measurements and being programmed to resolve range information from the measurements received by the image sensor.

According to a further aspect of the invention there is provided a time of flight camera system substantially as described above wherein the processor is configured to generate time of flight camera measurements by executing instructions which complete the steps of:

1) illuminating a time of flight camera system image sensor with radiation modulated by the first member of the set of phase separated output signals,
2) modulating the output of the image sensor with the source modulation signal and generating a first time of flight camera measurement by integrating the output of the image sensor over a standard measurement time while only the first member of the set of phase separated output signals is used to modulate the illuminating radiation,
3) illuminating the image sensor with radiation modulated by only the next member of the set of phase separated output signals and integrating the output of the image sensor over the standard measurement time while modulating the output of the image sensor with the source modulation signal to generate a further measurement,
4) repeating step 3 above for each remaining member of the set of phase separated output signals.

According to yet another aspect of the invention there is provided a computer readable medium embodying a program of computer executable instructions, the program of instructions including:

at least one instruction to receive a set of phase separated output signals, each output signal provided having one of a set phase offsets values applied, where at least one of these phase offset values is the cancellation phase value of another member of the set of phase offset values, and at least one instruction to illuminate a time of flight camera system image sensor with radiation modulated by the first member of the set of phase separated output signals, at least one instruction to modulate the output of the image sensor with a source modulation signal and generate a first time of flight camera measurement by integrating the output of the image sensor over a standard measurement time while only the first member of the set of phase separated output signals is used to modulate the illuminating radiation, at least one instruction to illuminate the image sensor with radiation modulated by only the next member of the set of phase separated output signals and integrating the output of the image sensor over the standard measurement time while modulating the output of the image sensor with the source modulation signal to generate a further measurement, at least one instruction to repeatedly generate further measurements by illuminating the image sensor using each remaining member of the set of phase separated output signals and integrating the output of the image sensor over the standard measurement time.

Preferably the set of phase adjusted output signals consists of four members with phase offsets values equal to 0, 90, 120 and 210 degrees.

Alternatively the set of phase adjusted output signals consists of four members with phase offsets equal values equal to 0, 90, 240, and 330 degrees.

The present invention incorporates within its scope a number of aspects from a signal harmonic error cancellation method for a time of flight camera system, through to a time of flight camera system which operates using this method, in addition to a program of computer executable instructions run by a processor associated with such a time of flight camera system. Those skilled in the art will appreciate that the invention encompasses all of the above aspects irrespective of whether primarily made to a correction method for time of flight camera system in isolation.

Those skilled in the art will also appreciate that references made to time of flight camera systems encompass technology equivalent and related to that disclosed in PCT Publication No. WO2004/090568 which is here incorporated by reference. The skilled addressee will also appreciate that the invention may be used in a variety of different camera systems which use homodyne amplitude modulated continuous wave (AMCW) lidar based on the time of flight (ToF) principle of light.

Such time of flight cameras incorporate at least one image sensor and a processor which is used to control the operation of the image sensor and to collect the data generated by this sensor. The camera processor can also be configured to process the data generated by the image sensor to provide a range or distance measurement for particular objects in a scene targeted by the camera.

Reference throughout this specification will also be made to the camera system provided including a single image sensor and a single processor. However those skilled in the art will appreciate that other hardware implementations using multiple cameras, or multiple processors are also within the scope of the invention.

Time of flight camera systems generate or receive a source modulation signal which is used to modulate radiation transmitted at a target scene and reflected from by objects in the scene on to the image sensor. Commonly this source modulation signal is generated using square wave based digital signals which include a number of harmonic components with frequencies which are multiples of the fundamental source modulation signal frequency.

A source modulation signal is used as an input of the invention to provide a set of phase separated output signals. Each of these signals is in turn used to modulate the radiation transmitted at the objects in a scene of interest, with the reflected radiation being captured by a camera system's image sensor. Reference throughout this specification will also be made to this image sensor being illuminated by the modulated radiation, which should be understood to be illumination by an intermediate reflection or backscattering from objects in the scene targeted by the camera.

Reference in general throughout this specification will also be made to the invention dealing with a time of flight camera data capture process which records a set of four measurements using a set of four phase separated output signals. Again those skilled in the art will appreciate that the invention may be implemented in other embodiments to generate different numbers of phase separated output signals for a data capture process dealing with more than four measurements.

Preferably each phase separated output signal is used separately to illuminate the scene of interest, resulting in radiation modulated by only one member of the set of output signals being reflected from objects in a scene and illuminating the time of flight camera systems image sensor. A measurement can be generated from the output of the image sensor integrated over a standard measurement time while the sensor is receiving radiation modulated by a single phase separated output signal. At the end of this standard measurement time a different member of the set of phase separated output signals can then be used to illuminate the scene, with the image sensor to again generating a further measurement by its output being integrated over the same standard measurement time. A full set of measurements can therefore be generated, one for each member of the set of phase separated output signals, allowing the camera system's processor to calculate range information for objects within the targeted scene using well-known time of flight processing algorithms.

The present invention includes at least one phase adjustment element which receives the source modulation signal as an input and adjusts the phase of the signal to produce the set of phase separated output signals required to operate the time of flight camera. Those skilled in the art will appreciate that a range of different technologies may be used to implement such a phase adjustment element and therefore need not be discussed in detail throughout the specification.

Each phase separated output signal has an associated phase offset value. The present invention may be utilised to control the particular phase offset values applied to each member of the set of output signals. These specific phase offset values can be set by the invention to ensure that corresponding members of the set are provided with a cancellation phase value. The measurements recorded by a time of flight camera using of these cancellation phase values can have the contribution of particular harmonics of the fundamental source modulation frequency cancelled.

These phase offset values are determined by assessing the range phasor representing the contribution of the identified harmonic, and considering the phase of its contribution over several different measurements.

This calculation can be made by fixing the phase offset applied to the first of these measurements to a known value while the second of the phase offset values required can be calculated so as to act as a cancellation phase. This cancellation phase will act to reverse the contribution of the harmonic provided by the first initial measurement, thereby cancelling the errors resulting from this identified harmonic in the measurements being taken.

Reference throughout this specification is made to a cancellation phase being a particular phase value which sets the phase of one of the output signals being provided by the invention. In particular embodiments the invention can be used to calculate an additive phase value which is added to the first selected phase step value to arrive at this cancellation phase value.

The cancellation phase value applied as one of the set of phase offset values differs from the phase of the harmonic contribution to the measurement being made. As the relative contributions from both the fundamental source frequency and its identified harmonic cycle at different frequencies each contribution will likely be at a different phase when a measurement is taken. The cancellation phase applied will therefore be a combination of the anticipated source frequency and that of the harmonic being cancelled.

In a preferred embodiment the calculation of a cancellation phase value can be made by considering the range phasor representing the measurements being made. This range phasor can be represented as set out below in terms of the contribution of the two measurements being considered—$m_o$ a first measurement with a known phase offset value set to 0—and, $m_\alpha$, being the additional measurement value which is to have its cancellation phase calculated.

$$\hat{p}_\alpha = \frac{m_\alpha - m_0}{i^\alpha - 1},$$

This expression can be re-written as follows to represent the square wave provided in digital signal processing applications where the term p represents a pure sine wave with the source modulation signal frequency. On the right hand side of the expression the term p represents the contribution provided at the fundamental source frequency, with each successive term building up the square wave form with the contribution of a further harmonic of the source frequency.

$$\hat{p}_\alpha = p + p_{-3} \frac{i^{-3\alpha} - 1}{i^\alpha - 1} \frac{1}{3^2} + p_5 \frac{i^{5\alpha} - 1}{i^\alpha - 1} \frac{1}{5^2} + \dots .$$

As can be seen from the expression above particular selections of the variable $\alpha$ will result in the provision of a cancellation phase for the second measurement to cancel the contributions of particular harmonics. For example, in a further preferred embodiment the selection of the values of 4/3 or 8/3 for $\alpha$ will result in a cancellation phase removing the $3^{rd}$ harmonic to the fundamental source modulation signal frequency when a set of four measurements are being recorded.

With the identification of these selections for the variable $\alpha$ a calculation can be made to determine the value of the cancellation phase required using the following relationship $$i^\alpha = e^{j\alpha\pi/2}$$

indicating that integer multiples of $\alpha$ provide phase rotations of $\pi/2$ or 90 degrees each. For a value of $\alpha=4/3$ when selecting a phase offset value of 0 degrees for a first measurement this approach yields $2\pi/3$ or 120 degrees to be added to form a cancellation phase from a second measurement. Preferably the remaining two phase offset values can be calculated for a four measurement process by setting the next initial measurement phase value to 90 degrees. This selection will yield a second cancellation phase of 210 degrees, being the original 90 degree phase offset with the calculated 120 degree value added.

In an alternative implementation the value of $\alpha=8/3$ can be used to arrive at phase step measurements of 0 and $4\pi/3$ or 240 degrees. In a four measurement process the next measurement can again have a phase offset value of 90 degrees selected, providing a second cancellation phase of 330 degrees.

Those skilled in the art will also appreciate that the invention may also be used to cancel the contributions of harmonic components other than the $3^{rd}$ harmonic referenced above. Furthermore, a cancellation method which removes a particular harmonic component will in turn remove the harmonic contributions of other harmonics which are multiples of the targeted harmonic, such as the ninth and fifteenth harmonic when the third harmonic is cancelled, or the tenth or fifteenth harmonic when the fifth harmonic is removed.

For example, the above embodiment may readily be modified to cancel the $5^{th}$ harmonic using $\alpha$ values of 4/5, 8/5, 12/5 or 16/5. In yet other instances the $7^{th}$ harmonic could be cancelled using $\alpha$ values of 4/7, 8/7, 12/7, 16/7, 20/7 or 24/7.

In more general terms, to target the $m^{th}$ harmonic, $\alpha$ values equal to 4j/m can be employed, where j is an integer not equal to zero or divisible by m. Therefore to cancel the $m^{th}$ harmonic the cancellation phase can be determined by the offset phase value used for the initial measurement added to the value determined by $2\pi j/m$, again where j is an integer not equal to zero and not divisible by the number of the identified harmonic, m.

The various aspects of the present invention therefore provide many potential advantages over the prior art. The invention may preferably be used in conjunction with time of flight camera systems to cancel the measurement errors caused by a particular harmonic component of the source modulation frequency used by the camera. The particular harmonic component targeted for cancellation can also be selected at will by a user of the invention. Furthermore, the higher order harmonics which are multiples of this particular targeted harmonic component will also be cancelled through the use of the invention. The error correction method of the invention allows for the determination of cancellation phase values which achieve this objective without requiring significant modifications to be made to existing time of flight camera systems.

BRIEF DESCRIPTION OF THE DRAWINGS

Additional and further aspects of the present invention will be apparent to the reader from the following description of specific embodiments, given in by way of example only, with reference to the accompanying drawings in which.

Figure 1:
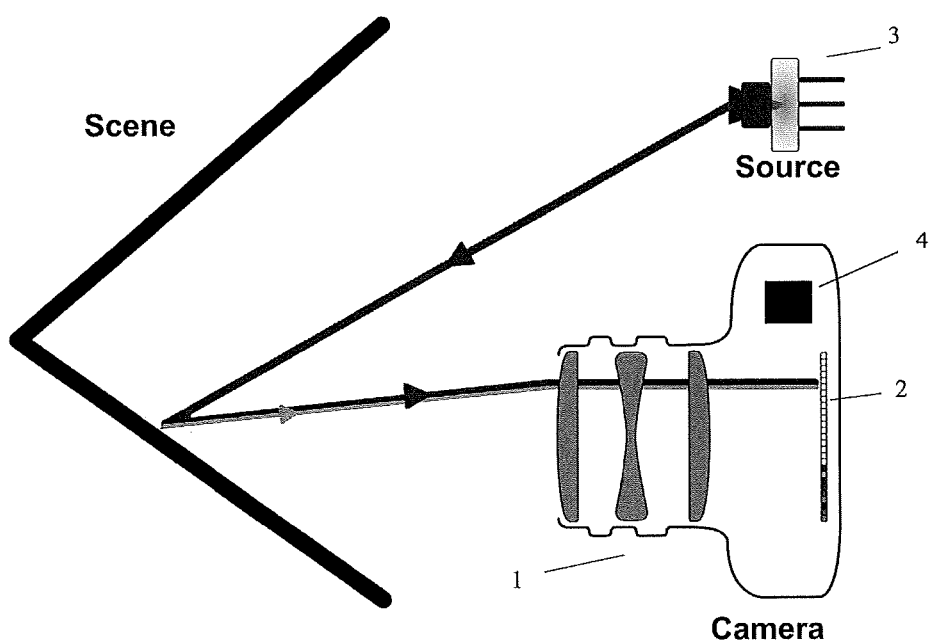
FIG. 1 shows a time of flight camera system implemented in accordance with one embodiment of the invention.

Further aspects of the invention will become apparent from the following description of the invention which is given by way of example only of particular embodiments.

BEST MODES FOR CARRYING OUT THE INVENTION

Amplitude modulated continuous wave time of flight range imaging provides a full field of distance measurement, but common hardware is implemented with digital technology which leads to unwanted harmonic content, a principle source of error in the distance measurements. Existing strategies for correction of harmonics require auxiliary measurements and amplify noise. A modification of the data acquisition procedure is described below which targets the third harmonic, the main cause of harmonic error.

Homodyne amplitude modulated continuous wave (AMCW) lidar is an active distance measurement technique based on the time of flight (ToF) principle of light. An AMCW camera performs lidar at each pixel, measuring a full image of distances. The advantages of AMCW ToF are fast acquisition of distance images from a single pixel array without the need for sophisticated solutions to inverse problems.

The homodyne AMCW measurement procedure involves modulation of the light source and sensor at the same rate as each other, $f_m$. For ease of implementation, typical hardware is based on digital electronics so use square wave modulation. The light source and sensor are both modulated with a programmable phase offset between them. The sensor measures light backscattered from the scene that travels a distance over a period of time dependent on the speed of light in the medium. This travel time, or ToF of the light, induces a phase shift in the rise and fall times of the light modulation which is encoded as the relative phase offset between the light and the sensor. The integrated intensity is proportional to the overlap in the modulation waveforms of the light source and sensor, and the overlap is in turn dependent on the relative phase offset.

We first consider the AMCW ToF process in the ideal case without harmonic error, and second return below to the implication and correction of square wave harmonics. With prior art data acquisition a set of N frames are measured, where for each frame we set a distinct phase offset: N evenly distributed phase steps between 0 and $2\pi$. The measurements, at each pixel, are discrete samples of the correlation between the light source and the sensor waveforms. In the ideal case the waveforms are sinusoidal and the ideal measurements, enumerated $I_n$ are $$I_n = \frac{A}{2}\cos\left(\phi - \frac{2\pi n}{N}\right) + B, n \in \{0, \ldots, N\}, \quad (1)$$

Where A is due to the backscattered light brightness, B is an additive term with contributions from ambient light and the light source, and ø is the phase offset between the sensor and the light return induced by the light travel distance. The relationship between phase ø and distance d is $$\phi = \frac{4\pi d \int_m}{c}, \quad (2)$$

Where c is the speed of light in the medium. Typically N=4, and recalling Euler's formula, the demodulation (computation of the complex range phasor estimate, p is $$p = Ae^{i\Phi} = (I_0 - I_2) + i(I_1 - I_3), \quad (3)$$

where i is the imaginary unit. The phase estimate ø is the angle of p recovered using the usual trigonometric operation $$\phi = \tan^{-1}\left(\frac{\Im p}{\Re p}\right). \quad (4)$$

It is a simple matter to reconstruct p from the $I_n$ via the alternative but equivalent steps. Compute the complex measurements, $$m_0 = p + C = I_0 + iI_1, \quad (5)$$

$$m_2 = -p + C = I_2 + iI_3, \quad (6)$$

where C=B+iB is a complex constant due to ambient light. In a more general form we have $$m_\alpha = pi^\alpha + C, \alpha \in \{0, 2\}. \quad (7)$$

Recovery of p is straightforward:

$$p = \frac{m_2 - m_0}{i^2 - 1}. \quad (8)$$

We now consider the case of harmonic error due to square wave modulation. Digital modulation introduces odd harmonics in the form of square waveforms. Assume the light source and sensor are modulated by a square wave function with a 50% duty cycle. Let p be the true range phasor without unwanted harmonic content, as above, and let p̂ below be the estimate with contamination by the unwanted harmonics. The result of the correlation of the square wave source and sensor functions is a triangle wave which produces the following mathematical form in the complex measurements $$m_\alpha = C + pi^\alpha + \frac{1}{3^2}p_{-3}i^{-3\alpha} + \frac{1}{5^2}p_5 i^{5\alpha} + \ldots, \quad (9)$$

Where $p_n = Ae^{in\emptyset}$. Let one value for $\alpha$ be 0, leave the second to be determined, and form the estimate for the range phasor $$\hat{p}_\alpha = \frac{m_\alpha - m_0}{i^\alpha - 1}, \quad (10)$$

$$\hat{p}_\alpha = p + p_{-3}\frac{i^{-3\alpha} - 1}{i^\alpha - 1}\frac{1}{3^2} + p_5 \frac{i^{5\alpha} - 1}{i^\alpha - 1}\frac{1}{5^2} + \ldots. \quad (11)$$

Immediately we see that when $$i^{3\alpha} = 1 \Rightarrow \alpha = \frac{4j}{3}, j \in \{1, 2, 3, \ldots\}, \quad (12)$$

then the third harmonic is cancelled. This harmonic cancellation is achieved by relaxing the constraint that the phase steps are evenly spaced. This result is a considerable improvement for such a small change to traditional four phase step AMCW ToF. Note that j=3 is equivalent to j=0 and the coefficients proceed to cycle.

Removal of higher order harmonics follows naturally by taking further measurements. From equation 11 repetition of the acquisition process with a phase shift corresponding to $\alpha=\frac{4}{5}$ and further algebraic manipulation leads to an estimate p̂ with cancellation of the fifth harmonic.

A specific implementation of this method to remove the third harmonic is described below in addition to a comparison to traditional four even phase step AMCW range measurement.

As illustrated by FIG. 1 a time of flight camera system 1 configured to implement one embodiment of the invention was used.

The camera 1 includes an image sensor 2 configured to measure radiation reflected from a target scene of interest, and a transmitter 3 arranged to transmit modulated radiation at the same scene. Also integrated into the camera is a processor 4 arranged to receive image sensor measurements and programmed to resolve range information from the measurements received by the image sensor. The processor 4 is also programmed to generate a source modulation signal and to implement a phase adjustment element using this generated signal. The processor 4 is linked to the transmitter 3 to provide the transmitter with a set of phase separated output signals in accordance with the implementation of the invention.

The camera was arranged to view a target of matte white foam board. A region of interest of one hundred and twenty pixels on the image of the target was carefully segmented, to choose data of adequate signal quality while avoiding saturated pixels, and averaged before analysis.

The camera is operated with a modulation frequency of 70 MHz which produces an ambiguity distance (distance where phase ø reaches $2\pi$, indistinguishable from 0 by examination of phase alone) of 2.25 m The phase step domain is divided in to N=36 evenly spaced positions. Under this regime, traditional AMCW corresponds to measurements at phase steps $n \in \{0,9,18,27\}$. The third order harmonic cancellation uses positions $n \in \{0,9\}$ for $\alpha=0$ and $n \in \{12,21\}$ for $\alpha=4/3$.

The phase offset between the light source and the sensor is incremented over the thirty six steps in hardware, producing an artificial phase sweep from which the harmonics are examined. One hundred and twenty of the thirty six distance step measurements are taken. To compare between the acquisition methods we: perform a direct examination of the distance measurement error, Fourier analysis to examine the negative third harmonic; and examine the standard deviation (STD) in the phase.

Figure 2:
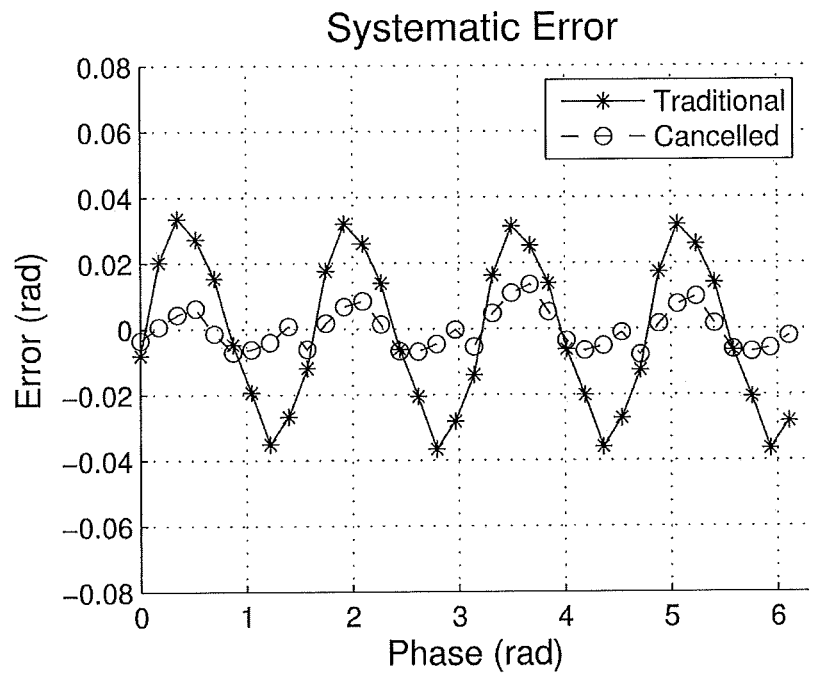
FIG. 2 shows a plot of measured mean phase error with distance for the results obtained for the value $\alpha=4/3$ compared to even phase steps in an embodiment of the invention which targets the $3^{rd}$ harmonic using four phase steps

From the results illustrated as FIG. 2 the phase linearity shows a marked improvement. In the traditional even phase step AMCW we see the four cycle error due to the third and fifth harmonics. The harmonic cancellation corrected error is dominated by the much smaller four cycle error due to the remaining fifth harmonic. The peak to peak phase error is reduced from 0.07 (rad) to 0.02 (rad), with precision given with respect to the results indicated by FIG. 4.

Figure 3:
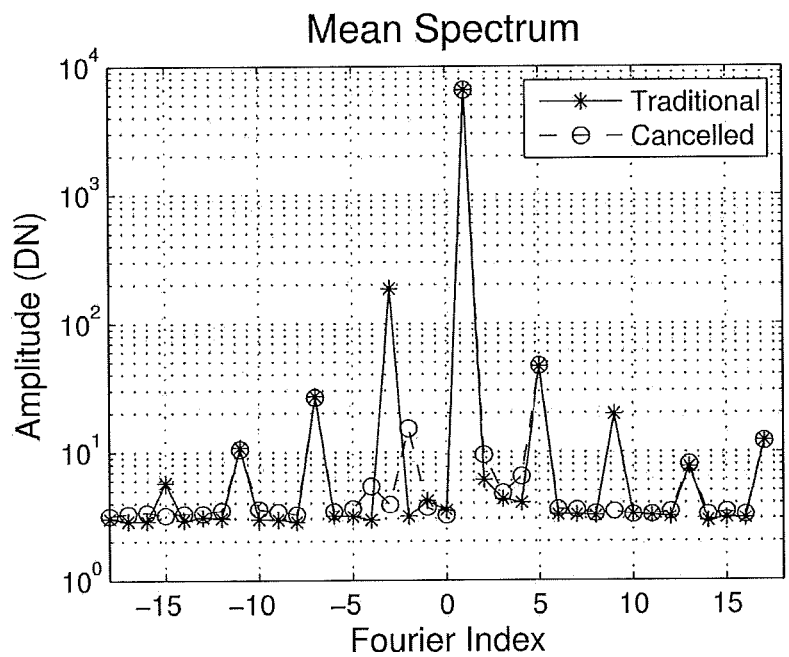
FIG. 3 shows a Fourier spectrum of the results obtained for the embodiment of the invention referenced with respect to FIG. 2. The fundamental or first harmonic is the first peak on the right side of the x-axis zero point, the third harmonic is the first peak on the left side of zero, the fifth harmonic is the second peak on the right of zero and the seventh harmonic is the second peak on the left of zero.

From Fourier analysis of the complex range phasors as shown by FIG. 3, the mean (STD) of amplitude of the negative third harmonic before correction is 186 (3) DN, and with correction 4 (2) DN. A two sample t-test shows that we can reject the hypothesis that the mean spectral feature at the negative third bins are equal (H=1, p<<0.01), which supports the claim that the cancellation of the negative third harmonic is successful. The ninth harmonic is also removed by the cancellation process that targets the third harmonic.

Figure 4:
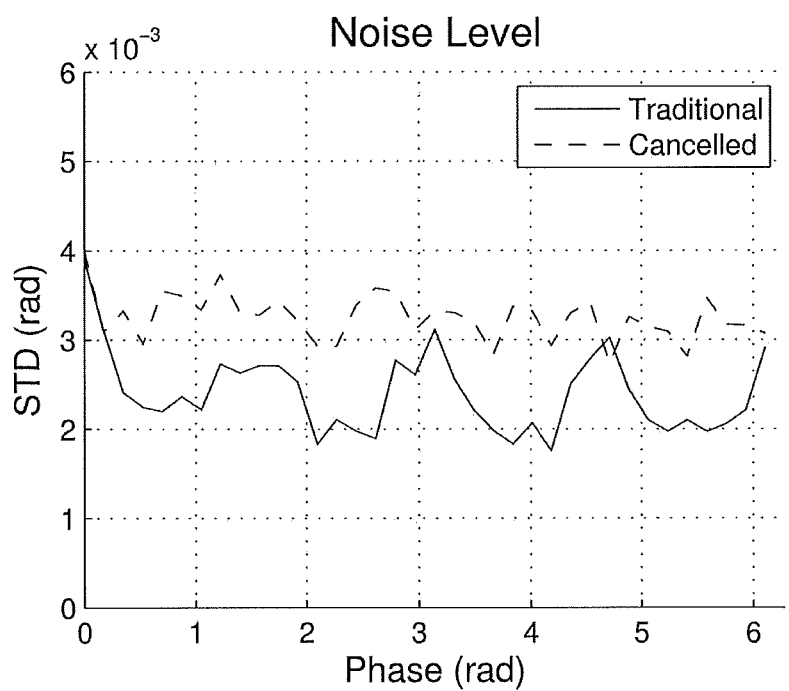
FIG. 4 show the standard deviation in phase for $\alpha=4/3$ in the embodiment discussed with respect to FIGS. 2 and 3. The data cover a phase sweep over one complete ambiguity distance.

The STD with distance shown by FIG. 4 indicates that the harmonic cancellation reduces the dependence on phase of precision that is seen in traditional four phase step AMCW ToF. Visually we see a small increase in noise (reduction of precision). An F-test over all phase estimates in the data shows that the null hypothesis that the difference in variance of the phase between the traditional method and the proposed harmonic cancellation cannot be rejected (H=0, p=0.96), which supports the assertion that the harmonic cancellation has no significant effect on the random noise.

This approach demonstrates harmonic cancellation in AMCW Time of Flight four phase step measurement with only a small change to the acquisition process. The third harmonic can be successfully removed with no significant change in standard deviation due to harmonic cancellation being detected. Furthermore this approach is extensible to cancel out higher order harmonics effects.

Figure 5:
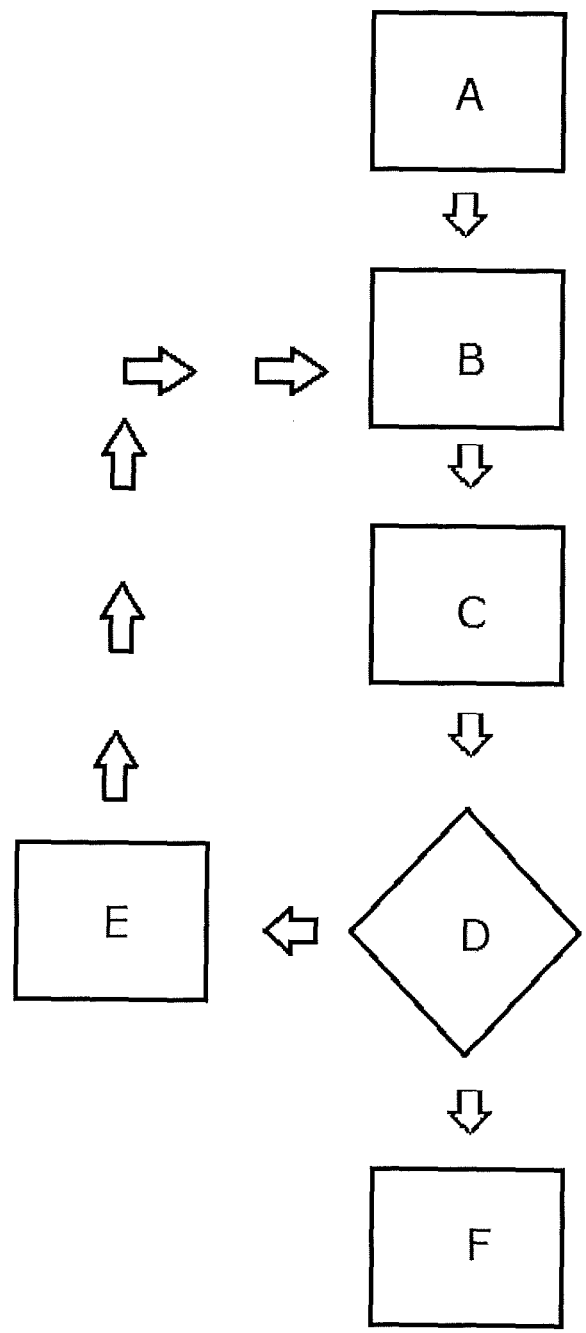
FIG. 5 shows an exemplary flow chart of computer executable instructions for measurement capture by a time of flight camera system implementing the invention in one embodiment.

An example set of processor instructions for measurement capture by a time of flight camera system implementing the invention are also illustrated with respect to FIG. 5.

These instructions implement a number of individual operational steps, starting with the first step A. At this step the processor executing these instructions receives a set of phase separated output signals which incorporate cancellation phase values at this stage the first member of the set of signals is designated as the current signal in this process the moves to step B.

At step B instructions are provided to deliver the current phase separated output signal to the transmitter of an associated time of flight camera with an instructions to trigger the transmission of radiation modulated by this signal. At the same time instructions are provided to deliver the original source modulation signal used to generate the phase separated output signals to an associated time of flight camera image sensor. These instructions are issued to ensure that the sensor output is modulated by the original source modulation signal while the transmitter output is modulated by the current phase separated output signal, allowing relative time of flight phase changes to be detected.

At step C instructions are provided to integrate the output of the associated time of flight camera image sensor over a fixed or standard integration time. At the end of this integration time a single measurement is recorded and the transmitter is instructed to cease transmission of the radiation modulated by the current phase separated output signal.

At step D a test is determined to assess whether the current phase separated output signal is the last member of the set supplied at step A. If the current signal is not the last member of the set step E is executed, while step F is executed if the current signal is the final member of the set.

At step E the next member of the set of supplied signals is designated to be the current signal and step B is again executed with this newly designated signal.

Figure 6:
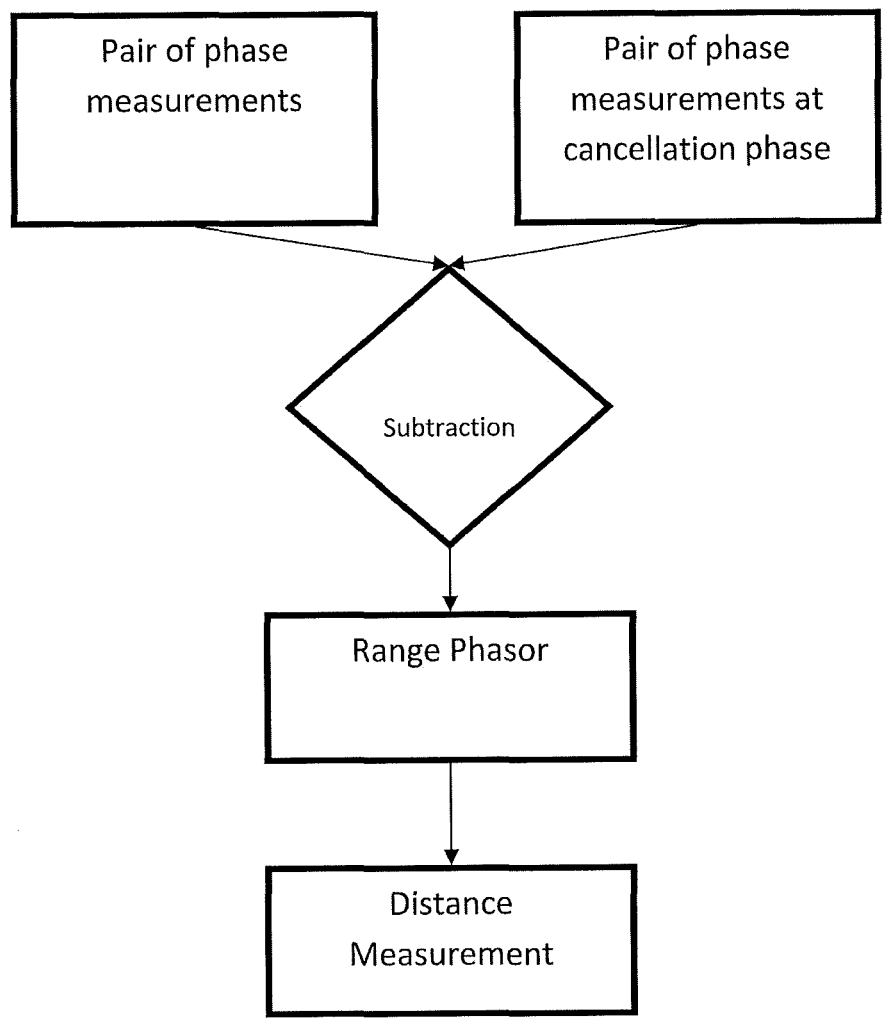
FIG. 6 shows an exemplary flow chart of computer executable instructions for the processing of measurements captured according to the embodiment illustrated in respect of FIG. 5.

At step F all of the measurements recorded are provided to a further processing stage for the calculation of image range information, as illustrated with respect to FIG. 6.

FIG. 6 illustrates a range information calculation process in an embodiment where a set of four phase separated output signals are used within the measurement capture process exemplified with respect to FIG. 5.

In the first stage of this process the four measurements captured are divided into the paired sets of measurements relating to initial phase offset values and cancellation phase values. At the second stage a subtraction operation is completed to derive a range phasor at the third stage, from which lastly distance or range information is extracted at the fourth stage.

In the preceding description and the following claims the word "comprise" or equivalent variations thereof is used in an inclusive sense to specify the presence of the stated feature or features. This term does not preclude the presence or addition of further features in various embodiments.

Those skilled in the art will appreciate that embodiments of the present invention comprise data media in the form of any combination of magnetic or optical storage media, EEPROM, static and dynamic RAM, and carrier media including electrical and optical signals.

Embodiments of the present invention comprise a software product, or carrier medium carrying instructions to perform any of the methods described herein in perform any of the processes performed herein, or to perform processes which configure hardware to perform processes or provide the apparatus described herein. For example, the instructions may be source or object code, or compiled firmware, or instructions in Verilog or VHDL.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What we claim is:

1. A method of signal harmonic error cancellation for a time of flight camera system comprising:
    i) generating a source modulation signal which includes at least one identified harmonic frequency;
    ii) adjusting the phase of the source modulation signal to provide a set of phase separated output signals which cancel error provided by the identified harmonic frequency, the output signals having phase offset values determined by the steps of:
    a. calculating the phase of the contribution of the identified harmonic to a measurement taken with a selected phase step value;
    b. determining a cancellation phase for the calculated phase of the harmonic contribution;
    c. determining a further phase step value which provides a measurement which includes a contribution from the identified harmonic, this contribution having a phase equal to the cancellation phase; and
    d. repeating steps a-c to determine the phase values to be applied to the set of phase separated output signals;
    iii) providing the set of phase adjusted signals to a time of flight camera system
    iv) modulating the output of the image sensor with the source modulation signal and illuminating a time of flight camera system image sensor with radiation modulated by the first member of the set of phase separated output signals;
    v) generating a time of flight camera measurement by integrating the output of the image sensor over a standard measurement time while only the first member of the set of phase separated output signals is used to modulate the illuminating radiation;
    vi) illuminating the image sensor with radiation modulated by only the next member of the set of phase separated output signals and integrating the output of the image sensor over the standard measurement time while modulating the output of the image sensor with the source modulation signal to generate a further measurement; and
    vii) repeating step (vi) above for each remaining member of the set of phase separated output signals.

2. The method of signal harmonic error cancellation of claim 1 wherein the phase of the contribution of the identified harmonic is calculated relative to the fundamental frequency of the source modulation signal.

3. The method of signal harmonic error cancellation of claim 1 wherein the set of phase adjusted signals consists of four members with phase offset values equal to 0, 90, 120 and 210 degrees.

4. The method of signal harmonic error cancellation of claim 1 wherein the set of phase adjusted signals consists of four members with phase offset values equal to 0, 90, 240 and 330 degrees.

5. The method of signal harmonic error cancellation of claim 1 wherein for the $m^{th}$ harmonic the cancellation phase measured in radians is determined by the offset phase value used for the initial measurement added to the value determined by $2\pi j/m$ where j is an integer not equal to zero and not divisible by the number of the identified harmonic m.

6. A time of flight camera system, comprising:
    a time of flight transmitter arranged to transmit modulated radiation at a target;
    a phase adjustment element configured to adjust the phase of a source modulation signal used to modulate the radiation transmitted at the target, the phase adjustment element providing a set of phase separated output signals, each output signal provided having one of a set phase offsets values applied, where at least one of these phase offset values is the cancellation phase value of another member of the set of phase offset values;
    an image sensor configured to measure radiation reflected from a target, the output of the image sensor being modulated by the source modulation signal; and
    a processor arranged to receive the image sensor measurements and being programmed to resolve range information from the measurements received by the image sensor, wherein the processor is configured to generate time of flight camera measurements by executing instructions which complete the steps of:
    1) illuminating a time of flight camera system image sensor with radiation modulated by the first member of the set of phase separated output signals;
    2) modulating the output of the image sensor with the source modulation signal and generating a first time of flight camera measurement by integrating the output of the image sensor over a standard measurement time while only the first member of the set of phase separated output signals is used to modulate the illuminating radiation;
    3) illuminating the image sensor with radiation modulated by only the next member of the set of phase separated output signals and integrating the output of the image sensor over the standard measurement time while modulating the output of the image sensor with the source modulation signal to generate a further measurement; and
    4) repeating step 3 above for each remaining member of the set of phase separated output signals.

7. The time of flight camera system of claim 6 wherein the phase adjustment element provides four output signals having phase offset values equal to 0, 90, 120 and 210 degrees.

8. The time of flight camera system of claim 6 wherein the phase adjustment element provides four output signals having phase offset values equal to 0, 90, 240, and 330 degrees.

9. A computer readable medium embodying a program of computer executable instructions, the program of instructions comprising:
    at least one instruction to receive a set of phase separated output signals, each output signal provided having one of a set of phase offset values applied, where at least one of these phase offset values is the cancellation phase value of another member of the set of phase offset values;

at least one instruction to illuminate a time of flight camera system image sensor with radiation modulated by the first member of the set of phase separated output signals;

at least one instruction to modulate the output of the image sensor with the source modulation signal and generate a first time of flight camera measurement by integrating the output of the image sensor over a standard measurement time while only the first member of the set of phase separated output signals is used to modulate the illuminating radiation;

at least one instruction to illuminate the image sensor with radiation modulated by only the next member of the set of phase separated output signals and integrating the output of the image sensor over the standard measurement time while modulating the output of the image sensor with the source modulation signal to generate a further measurement; and at least one instruction to repeatedly generate further measurements by illuminating the image sensor using each remaining member of the set of phase separated output signals and integrating the output of the image sensor over the standard measurement time.

10. The computer readable medium embodying a program of computer executable instructions of claim 9 wherein the set of phase adjusted output signals consists of four members with phase offsets values equal to 0, 90, 120 and 210 degrees.

11. The computer readable medium embodying a program of computer executable instructions of claim 9 wherein the set of phase adjusted output signals consists of four members with phase offset values equal to 0, 90, 240, and 330 degrees.

* * * * *